US006529319B2

(12) United States Patent
Youn et al.

(10) Patent No.: US 6,529,319 B2
(45) Date of Patent: Mar. 4, 2003

(54) AUTOMATIC GAIN-CONTROLLED OPTICAL FIBER AMPLIFIER

(75) Inventors: Ji-Wook Youn, Taejon (KR);
Kwang-Joon Kim, Taejon (KR);
Hee-Sang Chung, Taejon (KR);
Jong-Hyun Lee, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/827,211

(22) Filed: Apr. 6, 2001

(65) Prior Publication Data

US 2002/0075562 A1 Jun. 20, 2002

(30) Foreign Application Priority Data

Dec. 14, 2000 (KR) ........................................ 2000-76689

(51) Int. Cl.[7] .............................................. H04B 10/12
(52) U.S. Cl. ........................ 359/341.41; 359/349.42; 359/337.11; 359/337.12
(58) Field of Search ......................... 359/337, 337.1, 359/337.11, 337.12, 337.13, 341.1, 341.3, 341.32, 341.33, 341.41, 341.43

(56) References Cited

U.S. PATENT DOCUMENTS

| | | | | |
|---|---|---|---|---|
| 5,245,690 A | * | 9/1993 | Aida et al. | 359/337.11 |
| 5,282,074 A | * | 1/1994 | Miyazaki et al. | 359/174 |
| 5,631,758 A | * | 5/1997 | Knox et al. | 359/124 |
| 5,636,301 A | * | 6/1997 | O'Sullivan et al. | 385/24 |
| 5,680,247 A | * | 10/1997 | Okuno | 359/134 |
| 5,764,404 A | * | 6/1998 | Yamane et al. | 359/124 |
| 5,861,980 A | | 1/1999 | Ono | |
| 5,933,262 A | * | 8/1999 | Sasagawa | 359/127 |
| 5,966,236 A | * | 10/1999 | Okuno | 359/130 |
| 6,008,932 A | | 12/1999 | Luo et al. | |
| 6,023,366 A | * | 2/2000 | Kinoshita | 359/177 |
| 6,072,601 A | * | 6/2000 | Toyohara | 358/484 |
| 6,111,688 A | * | 8/2000 | Kobayashi et al. | 359/337.13 |
| 6,356,386 B1 | * | 3/2002 | Denkin et al. | 359/124 |
| 6,366,393 B1 | * | 4/2002 | Feulner et al. | 359/337 |
| 6,373,625 B1 | * | 4/2002 | Kobayashi et al. | 359/337.12 |

OTHER PUBLICATIONS

Suzuki, et al.; *Dynamic Gain Control by Maximum Signal Power Channel in Optical Linear Repeaters for WDM Photonic Transport Networks*; IEEE Photonics Technology Letters, vol. 10, No. 5, May 1998; pp. 734–736.

* cited by examiner

Primary Examiner—Thomas H. Tarcza
Assistant Examiner—Stephen Cunningham
(74) Attorney, Agent, or Firm—Jacobson Holman PLLC

(57) ABSTRACT

The present invention is to provide an automatic gain-controlled optical fiber amplifier, comprising: a first optical branch for branching a portion of an optical signal inputted into the optical fiber amplifier; a second optical branch for branching a portion of an optical signal outputted from the optical fiber amplifier; an optical distributor for receiving the optical signal of an input side branched partially by the first optical branch and for outputting it separately; a first wavelength selector for receiving the optical signal of a one side distributed by the optical distributor and for selecting a predetermined wavelength optical signal; a second wavelength selector for receiving the optical signal of an output side branched partially by the second optical branch and for selecting the predetermined wavelength optical signal; a signal processor for receiving the optical signal of a second side distributed by the optical distributor and the predetermined wavelength optical signal selected by the first and second optical wavelength selector and for measuring a total power of an input signal and a number of input channels; and a controller for generating a control signal according to the total power of the input signal and the number of input channels measured by the signal processor.

4 Claims, 6 Drawing Sheets

AUTOMATIC GAIN-CONTROLLED OPTICAL FIBER AMPLIFIER

FIELD OF THE INVENTION

The present invention relates to an automatic gain-controlled optical fiber amplifier, and, more particularly, to an erbium doped fiber ampliFier (EDFA) for use a multi-wavelength optical transmission system which maintain an output of each channel of the optical fiber amplifier regardless of a transmission line loss or a variation of a number of input channels and has a rapid speed and a simple structure.

DESCRIPTION OF THE PRIOR ART

Generally, the optical fiber amplifier amplifies directly an optical signal using an erbium doped fiber, and in present, is used diversely as a repeater and a switch element in a multi-wavelength optical transmission system.

The input power of the optical fiber amplifier is varied by various causes, such as a variation of transmission line loss and that of a number of input channels of the optical fiber amplifier due to network reconfiguration or using an optical add/drop multiplexer.

A conventional multi-wavelength optical transmission system is operated by point-to-point transmission method, thereby fixing the number of input channels of the optical fiber amplifier. Therefore, a variation of the input signal power of the optical fiber amplifier is only changed by a transmission line loss.

However, a multi-wavelength optical transmission system in accordance with the present invention is changed by point-to-multipoint transmission method, thereby changing the number of the input channels of the optical fiber amplifier because optical channels are added or dropped in each node.

Therefore, in order to use an optical fiber amplifier in a multi-wavelength optical transmission system of point-to-multipoint method, it has to recognize whether the variation of the input signal power of the optical fiber amplifier is caused by a transmission line loss or a changing of the number of the input channels and maintain constantly an output of each channel.

SUMMARY OF THE INVENTION

It is, therefore, an object of the present invention to provide an automatic gain-controlled optical fiber amplifier which maintains an output of each channel of the optical fiber amplifier regardless of a transmission line loss or a variation of a number of input channels and has a rapid speed and a simple structure.

It is another object of the present invention to provide an automatic gain-controlled optical fiber amplifier which measures a number of input channels by an input power of an optional channel signal and an amplified spontaneous emission (hereinafter, referred as "ASE") noise from the output measured by using a wavelength selection filer and then, maintains an output of each channel of the optical fiber amplifier regardless of a transmission line loss or a variation of a number of input channels.

To achieve the above object, in accordance with one aspect of the present invention, there is provided an automatic gain-controlled optical fiber amplifier, comprising: a first optical branch for branching a portion of an optical signal inputted into the optical fiber amplifier; a second optical branch for branching a portion of an optical signal outputted from the optical fiber amplifier; a optical distributor for receiving the optical signal of an input side branched partially by the first optical branch and for outputting separately it; a first wavelength selector for receiving the optical signal of an one side distributed by the optical distributor and for selecting a predetermined wavelength optical signal; a second wavelength selector for receiving the optical signal of a output side branched partially by the second optical branch and for selecting the predetermined wavelength optical signal; a signal processor for receiving the optical signal of a second side distributed by the optical distributor and the predetermined wavelength optical signal selected by the first and second optical wavelength selector and for measuring a total power of an input signal and a number of input channels; a controller for generating a control signal according to the total power of the input signal and the number of input channels measured by the signal processor; and a optical amplifier and attenuator for outputting into the second optical branch by amplifying and attenuating the optical signal inputted from the first optical branch by means of the control signal of the controller.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 1A:
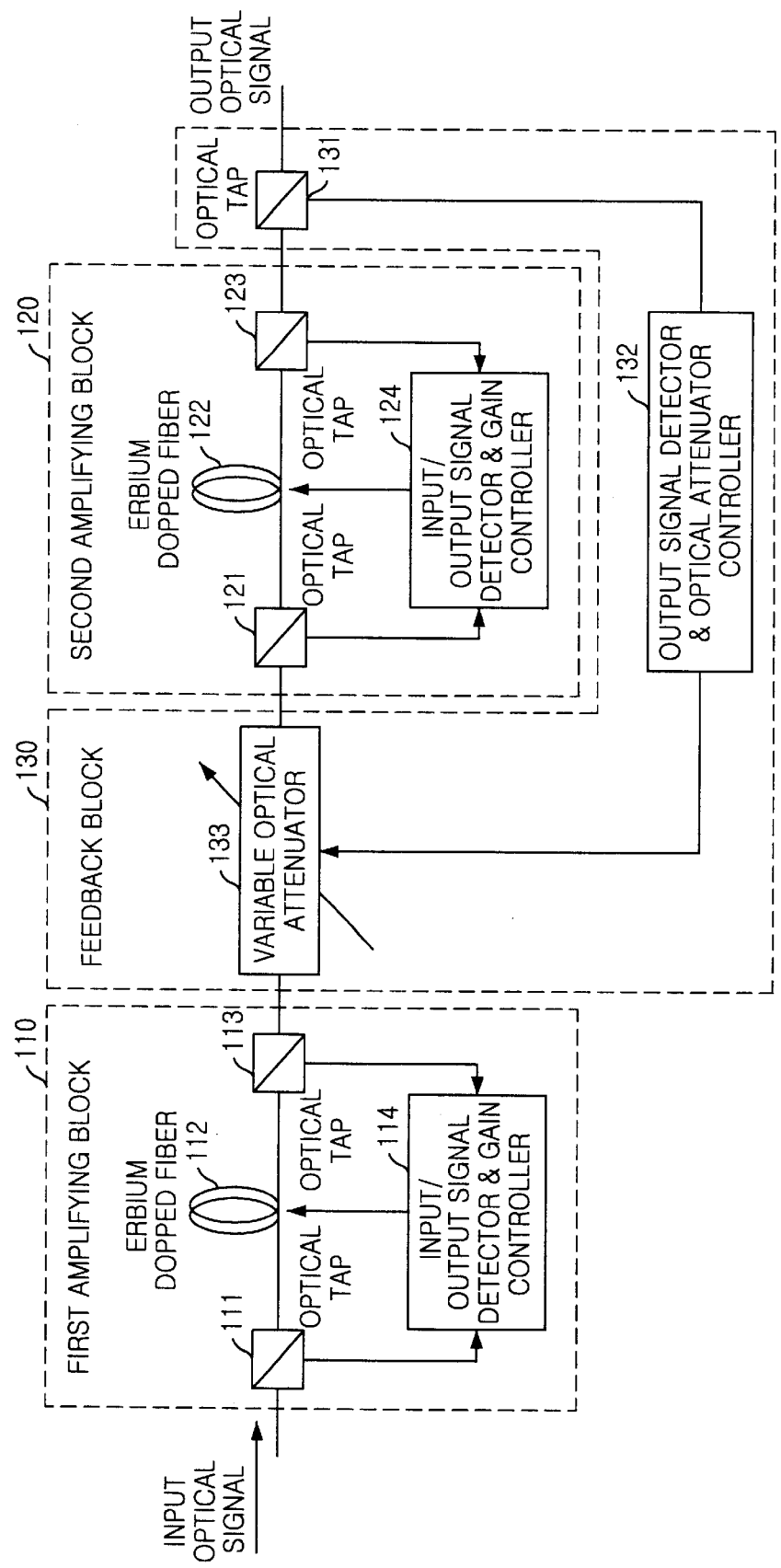
FIG. 1A is an exemplary diagram of an optical fiber amplifier having a conventional two-stage amplifying structure.

FIG. 1A is an exemplary diagram of an optical fiber amplifier having a conventional two-stage amplifying structure.

As shown in FIG. 1A, an optical fiber amplifier includes a one-stage amplifying block 110, a two-stage amplifying block 120 and a feedback block 130.

Each amplifying block 110 and 120 includes optical taps 111 and 121 for branching a part of input signal, erbium doped fibers 112 and 122 for amplifying an optical signal, optical taps 113 and 123 for branching a part of output signal and gain controllers 114 and 124 for controlling a gain of amplifier by controlling a current of a pumping laser after detecting a power of the input and output signal. Also, a feedback block 130 includes an optical tap 131 for branching a part of output of a two-stage amplifying block 120, an optical attenuator controller 132 for controlling a degree of a variable optical attenuator 133 after detecting a power of the branched optical signal and an optical attenuator 133 for attenuating an optical signal according to a control signal.

At this time, after the input signal is one-stage amplified by the erbium doped fiber 112, it is attenuated to an optional value by the variable optical attenuator 133 and is two-stage amplified by the erbium doped fiber 122.

Since a gain of each wavelength of the optical fiber amplifier varies according to the power of the input signal, it must control a current of a pumping laser according to the variation of the input signal power, and thereby can maintain constantly a gain characteristic of each wavelength of the optical fiber amplifier. Therefore, the gain controllers 114 and 124 detect the power of the input and output signal of each amplifying block and then, it controls the current of the pumping laser in order to make a gain of each wavelength maintain a given value.

However, since the gain controlling method as above measures only the total power of the input and output signal, in case of varying the number of input channels of the optical fiber amplifier by adding and dropping of optical channel, it occurs a power transients phenomenon in surviving channels.

When the number of input channels decreases, the optical fiber amplifier of FIG. 1A recognizes that the total power of the input signal decreases and increases the gain of each wavelength, and thereby generating the power transients phenomenon in surviving channels.

Figure 1B:
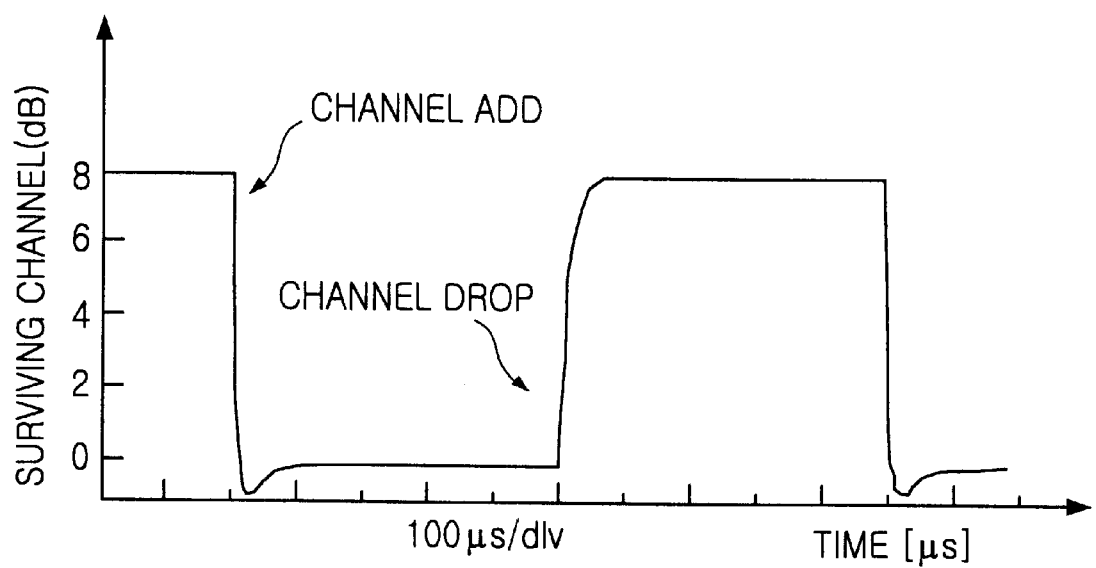
FIG. 1B is an exemplary graph of power transients phenomenon in surviving channels according to a variation of a number of input channels of a conventional optical fiber amplifier of two-stage structure.

FIG. 1B is an exemplary of power transients phenomenon in surviving channels according to a variation of a number of input channels of a conventional optical fiber amplifier of two-stage structure.

As shown in FIG. 1B, in the optical fiber amplifier of FIG. 1A, the power transients phenomenon occurs in surviving channels according to a variation of the number of input channels. That is, when the number of input channels of the optical fiber amplifier varies, the optical fiber amplifier fixes the total power of the output signal, and thereby generating the power transients phenomenon. The more the number of added and dropped channel increases, the more the power transients phenomenon is frequent.

The power transients phenomenon in surviving channels of optical fiber amplifier decreases the optical signal-to-noise ratio by causing a nonlinear phenomenon in an optical transmission line. Accordingly, in order to ensure quality of service in the multi-wavelength optical transmission system, it has to be controlled the gain of each wavelength of the optical fiber amplifier regardless of the variation of the number of input channels.

Figure 2:
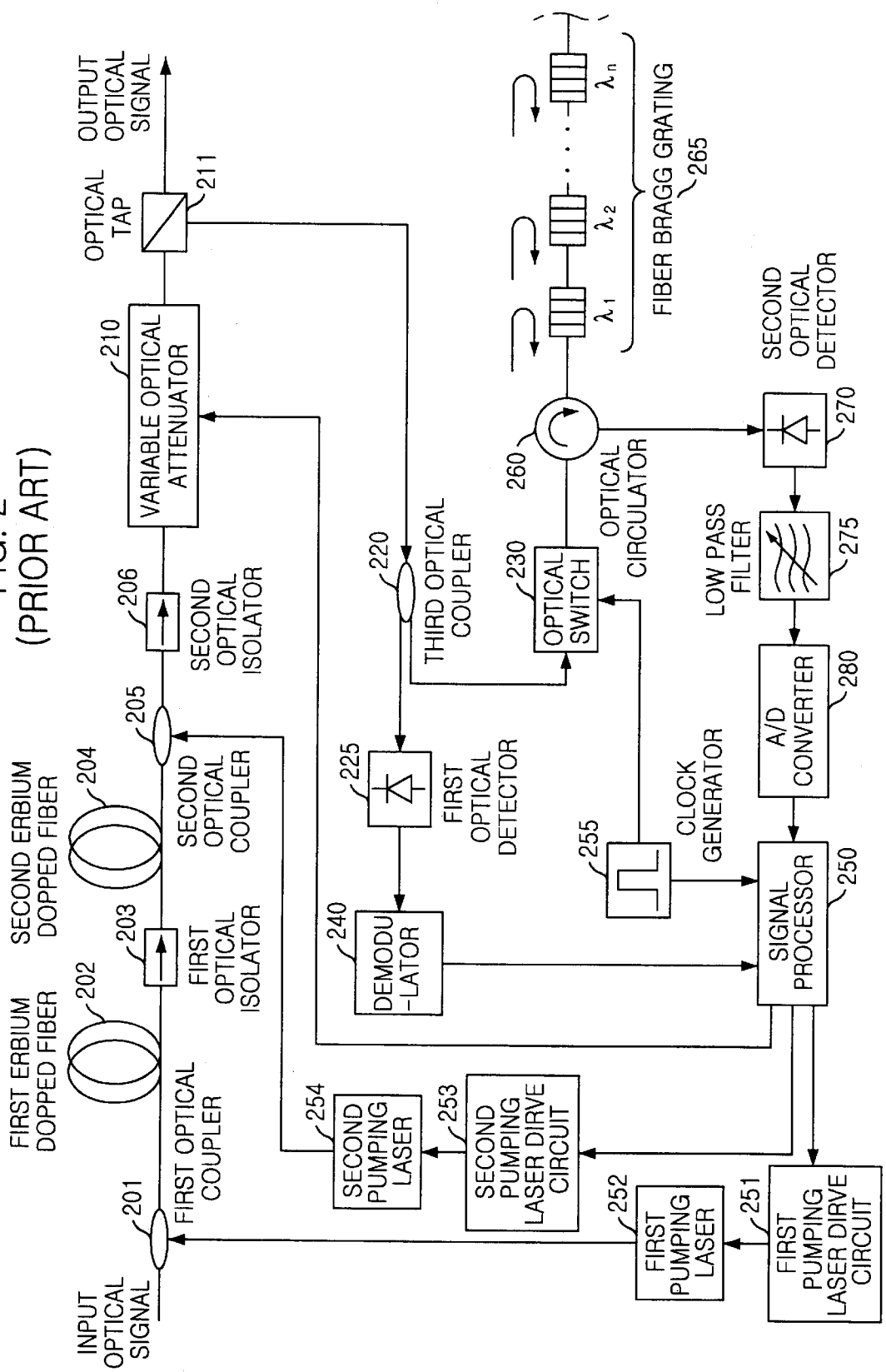
FIG. 2 is an exemplary diagram of a conventional automatic gain-controlled optical fiber amplifier.

FIG. 2 is exemplary diagram of a conventional automatic gain-controlled optical fiber amplifier.

As shown in FIG. 2, the input signal is amplified through erbium doped fibers 202 and 204 and then, is outputted through optical isolators 203 and 206 and a variable optical attenuator 210. At this time, the variable optical attenuator 210 controls the power transients phenomenon in the output according to the variation of the input power of the optical fiber amplifier.

Hereinafter, a detailed description of the conventional automatic gain-controlled optical fiber amplifier will be provided.

The output signal which is branched by an optical tap 211 is inputted into a first optical detector 225 and an optical switch 230, respectively, by a third optical coupler 220. The signal detected by the first optical detector 225 represents the total output power of the optical fiber amplifier and is inputted into a signal processor 250 after being demodulated in a demodulator 240.

Meanwhile, the signal which is inputted into the optical switch 230 is inputted into an optical fiber Bragg grating 265 connected in a row by an optical circulator 260. The optical fiber Bragg grating 265 is separated in a regular interval having the same Bragg wavelength as a center wavelength of signal, and thereby separating the output signal of the optical fiber amplifier into each channel signal with a regular time interval.

After the signal detected by a second optical detector 270 has a low pass filter 275, it is converted to a digital signal by an analog/digital converter 280 and is inputted into a signal processor 250. The signal processor 250 measures the total signal power of the optical fiber amplifier using the signal detected by the first optical detector 225 and the output power of each channel and the number of channels from the signal detected from the second optical detector 270.

Then, the signal processor 250 controls a current of pumping lasers 252 and 254 through pumping laser drive circuits 251 and 253 using the measured total power of the output signal, and thereby controlling a gain of optical fiber amplifier. Also, it controls the variable optical attenuator 210 by using the number of the measured channels, thereby controlling the power transients phenomenon by the variation of the number of input channels.

In general, the power transients phenomenon by the variation of the number of input channels of the optical fiber amplifier occurs very rapid comparing with that of transmission line loss. The more the number of optical fiber amplifiers constituting the multi-wavelength optical transmission system increases, the more it requires a rapid gain control. Therefore, in order to ensure quality of service in multi-wavelength optical transmission system, it must control with rapidity.

However, as shown in FIG. 2, since a conventional automatic gain-controlled optical fiber amplifier for multi-wavelength optical transmission system separates an output signal by the time, it has a problem that cannot control the power transients phenomenon in the surviving channels on time.

Also, since a conventional optical fiber amplifier has a shortcoming in case that there is not a channel signal which is constantly dropped, regardless of adding and dropping of the input channels, it requires an optical Bragg grating as many as the total number of channels. The more the number of input channels increases, the more a volume of system extends. In addition, it requires an optical switch and a clock generator.

Figure 3:
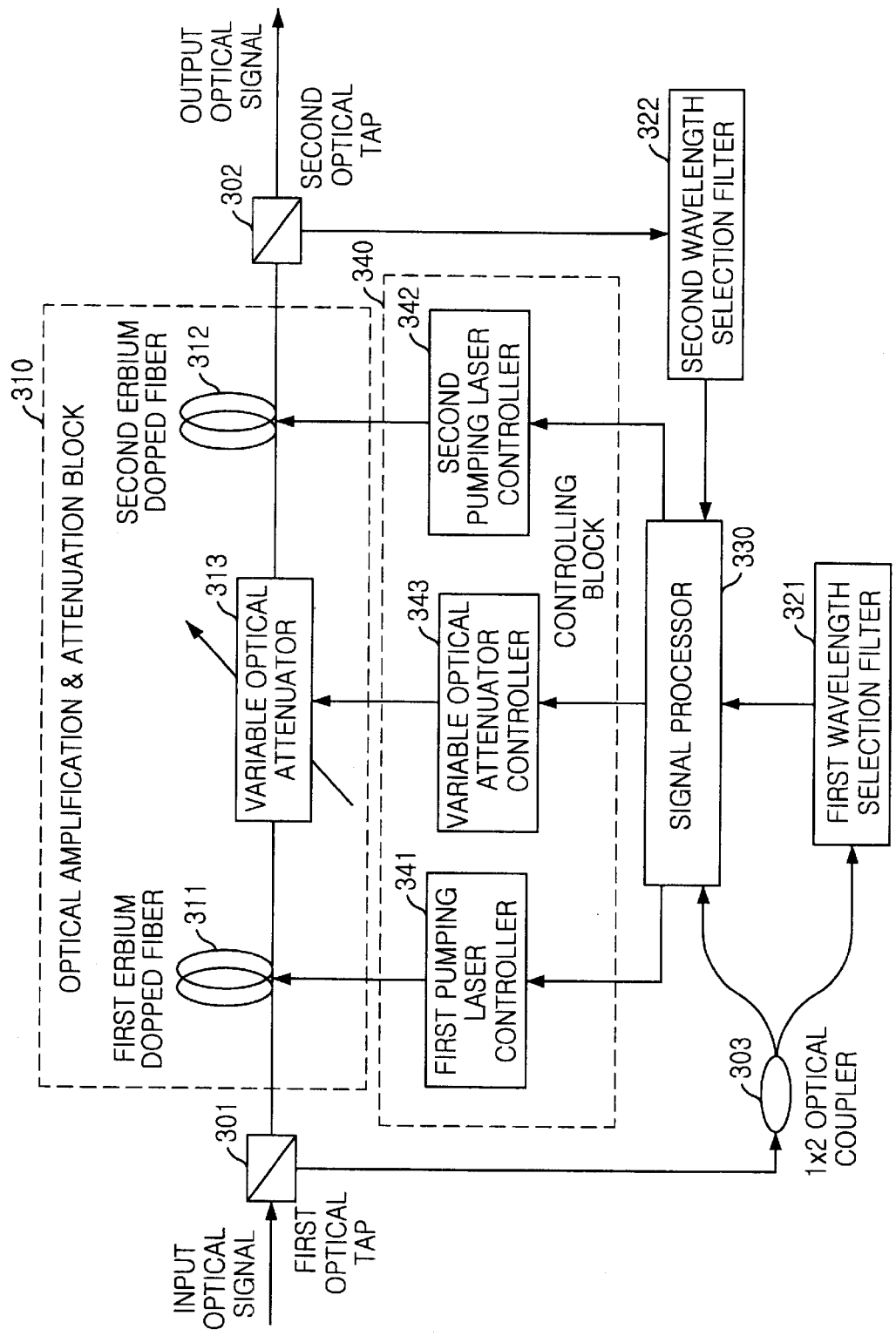
FIG. 3 is an exemplary diagram of an automatic gain-controlled optical fiber amplifier in accordance with the present invention.

FIG. 3 is an exemplary diagram of an automatic gain-controlled optical fiber amplifier in accordance with the present invention.

As shown in FIG. 3, an automatic gain-controlled optical fiber amplifier of a multi-wavelength optical transmission system in accordance with the present invention includes a first optical tap 301 for branching a part of an input signal, a second optical tap 302 for branching a part of a output signal, a 1×2 optical coupler 303 for distributing the output of the first optical tap 301 to a signal processor 330 and a first wavelength selection filter 321, respectively, the first wavelength selection filter 321 for separating an optional channel signal from a signal of a one side of the 1×2 optical coupler 303, a second wavelength selection filter 322 for separating an optional channel signal among the signals branched from the second optical tap 302, a signal processor 330 for receiving a signal from the 1×2 optical coupler 303 and the wavelength selection filters 321 and 322 and for measuring the total power of the input signal and the number of input channels, a controlling block 340 for generating an amplifying and attenuating control signal according to the measurement result of the signal processor 330, and an optical amplification and attenuation block 310 for amplifying and attenuating the optical signal inputted by the first optical tap 301 according to the control signal of the controlling block 340 and for outputting into the second optical tap 302.

Here, the 1×2 optical coupler 303 represents a distributor which divides the signal into two parts equally and outputs the equal parts.

The controlling block 340 includes a variable optical attenuator controller 343 for controlling a variable optical attenuator 313 by the control signal according to the measurement result inputted from the signal processor 330 which receives the signal from the 1×2 optical coupler 303 and the wavelength selection filters 321 and 322 and measures the total power of the input signal and the number of input channels.

The optical amplification and attenuation block 310 includes erbium doped fibers 311 and 312 for amplifying the input signal according to the current of the pumping laser controlled by the pumping laser controllers 341 and 342 and a variable optical attenuator 313 for attenuating the input power of the second erbium doped fiber 312 by control signal from the variable optical attenuator controller 343.

The optical fiber amplifier in accordance with the present invention measures a signal power of an optional channel among the input signals and output signals of optical amplification and attenuation block 310 by using the wavelength selection filters 321 and 322, without separating the input signal into each channel or inserting an additional monitoring channel in order to measure the number of the input channels.

At this time, the wavelength of each channel in the multi-wavelength optical transmission system is predetermined by ITU-T standard. Accordingly, it is possible to measure the power of the channel signal in an optional wavelength using the wavelength selection filers 321 and 322.

The power of the measured optional channel signal presents differently according to adding and dropping of the signal.

That is, when the signal having the same center wavelength as that of the wavelength selection filters 321 and 322 (hereinafter, referred as "sample signal") is inputted by undivided at a front node of the optical fiber amplifier, the signal processor 330 detects the power of the sample signal from the first wavelength selection filter 321, and thereby becomes the power of one channel signal in the input of the optical fiber amplifier.

However, if the sample signal is dropped at the front node of the optical fiber amplifier, the first wavelength selection filter 321 cannot measure the sample signal. At this time, the signal processor 330 recognizes that the sample signal is not inputted through an internal comparator and then, the signal processor can measure the number of the input channels using ASE noise in the sample signal wavelength which is measured in the second wavelength selection filter 322 located in the output side of the optical fiber amplifier.

Figure 4A:
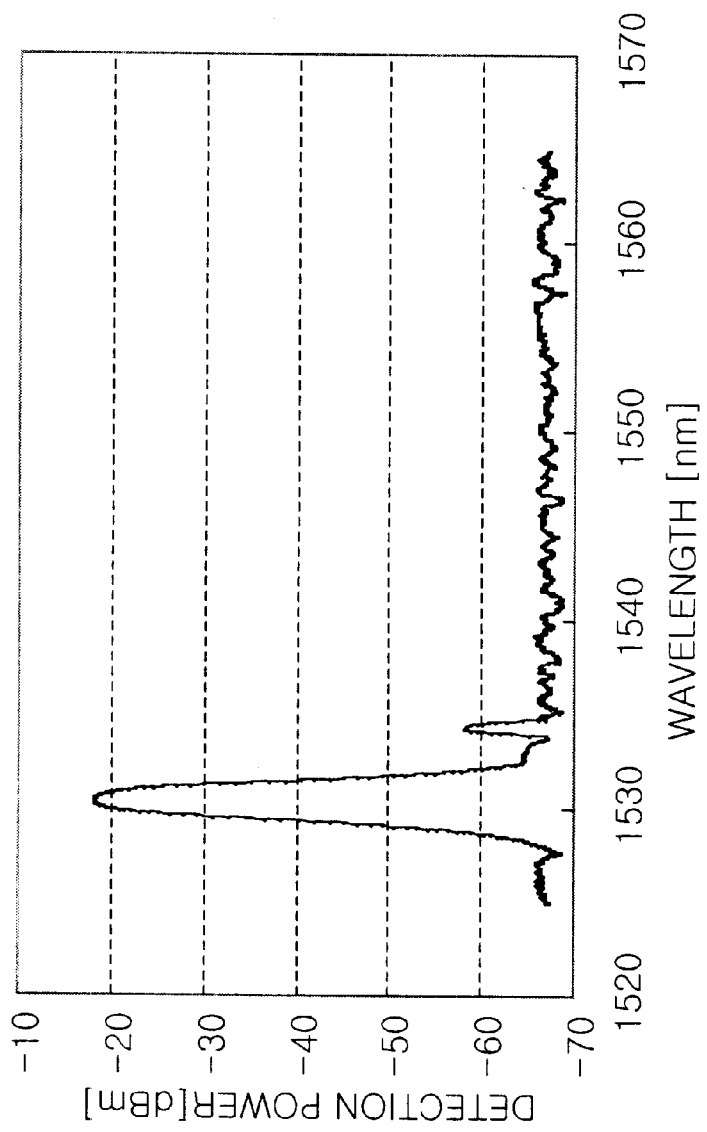
FIG. 4A is a graph illustrating the amplified spontaneous emission (ASE) noise power in an optional signal wavelength measured from the output of the optical fiber amplifier in accordance with the present invention.
Figure 4B:
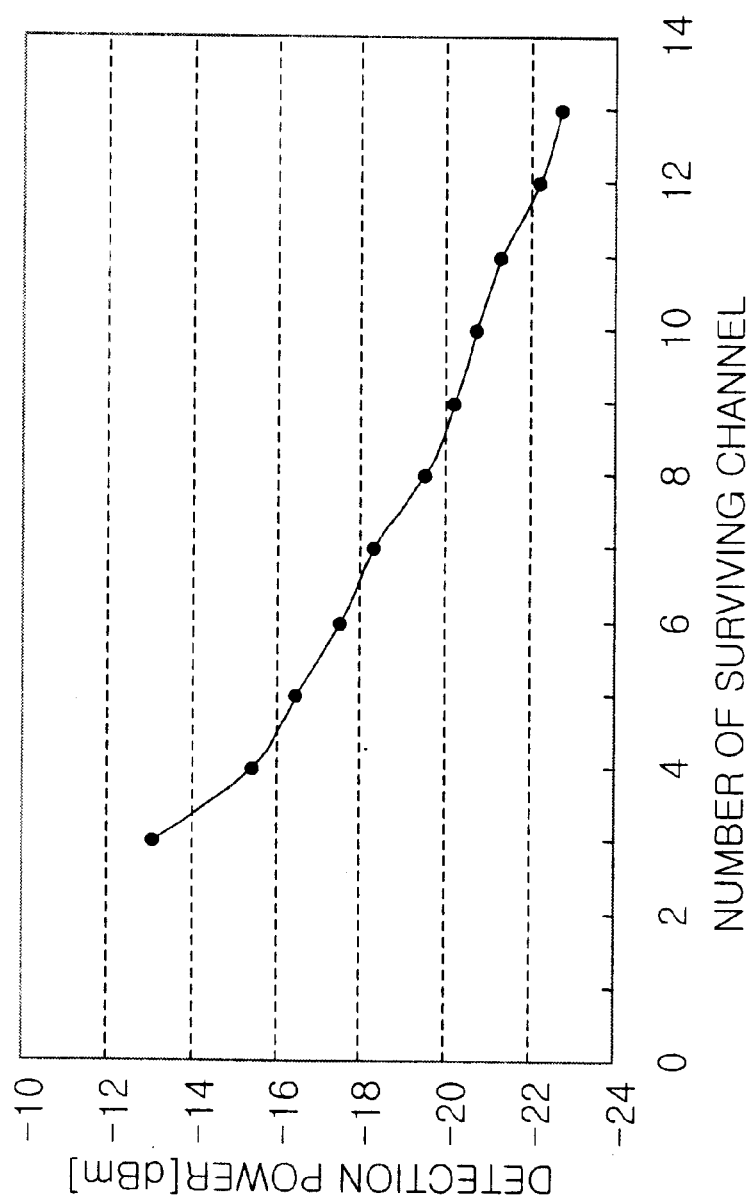
FIG. 4B is a graph showing a variation of the amplified spontaneous emission (ASE) noise power measured from the output according to a variation of a number of input channels in the optical fiber amplifier in accordance with the present invention.

A graph for the characteristic of ASE noise in the output of the optical fiber amplifier which changes according to the number of the input channels are described in FIG. 4B.

FIG. 4A is a graph illustrating the amplified spontaneous emission (ASE) noise power in an optional signal wavelength measured from the output of the optical fiber amplifier in accordance with the present invention.

In case that seven channel signals having −17 dBm signal power is inputted into the optical fiber amplifier of FIG. 3, the ASE noise in the wavelength of the sample signal measured by the wavelength selection filter (322 in FIG. 3) is the same as that of FIG. 4A. Here, the sample signal has a center wavelength of 1530.3 nm.

FIG. 4B is a graph showing a variation of the amplified spontaneous emission (ASE) noise power measured from the output according to a variation of a number of input channels in the optical fiber amplifier in accordance with the present invention.

As shown in FIG. 4B, in the optical fiber amplifier of FIG. 3, as the input signal of the optical fiber amplifier is dropped one by one, the signal power is varied at least 0.5 dB.

Therefore, in case that the sample signal is dropped at the front node of the optical fiber amplifier, using the ASE noise power of the sample signal wavelength in the output of the optical fiber amplified measured by the wavelength selection filter (322 in FIG. 3), the number of the input channels of the optical fiber amplifier can be measured.

For example, if the measured ASE noise power is −20 dBm, the number of the input channels is nine and if the ASE noise power is −22 dBm, the number of the input channels is twelve.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An automatic gain-controlled optical fiber amplifier, comprising:

a first optical branching means for branching a portion of an optical signal inputted into the optical fiber amplifier;

a second optical branching means for branching a portion of an optical signal outputted from the optical fiber amplifier;

an optical distributing means for receiving the optical signal of an input side branched partially by the first optical branching means and for outputting it separately;

a first wavelength selecting means for receiving the optical signal of a one side distributed by the optical distributing means and for selecting a predetermined wavelength optical signal;

a second wavelength selecting means for receiving the optical signal of an output side branched partially by the second optical branching means and for selecting the predetermined wavelength optical signal;

a signal processing means for receiving the optical signal of a second side distributed by the optical distributing means and the predetermined wavelength optical signal selected by the first and second optical wavelength selecting means and for measuring a total power of an input signal and a number of input channels;

a controlling means for generating a control signal according to the total power of the input signal and the number of input channels measured by the signal processing means; and an optical amplifying and attenuating means for outputting into the second optical branching means by amplifying and attenuating the optical signal inputted from the first optical branching means by the control signal of the controlling means, wherein the signal processing means measures the total power of the input signal and the number of input channels by the optical signal inputted from the optical distributing means and the first optical wavelength selecting means, and in case that there is not the input signal from the first optical wavelength selecting means, calculates the number of input channels by using amplified spontaneous emission (ASE) noise measured by the optical signal inputted from the second optical wavelength selecting means.

2. The automatic gain-controlled optical fiber amplifier as recited in claim 1, wherein the optical amplifying and attenuating means includes:

a first optical fiber amplifying means for receiving the branched optical signal by the first optical branching means and for amplifying the inputted optical signal according to a first amplifying control signal from the controlling means;

an optical attenuating means for attenuating the power of the amplified signal outputted from the first optical fiber amplifying means according to the attenuating control signal from the controlling means; and a second optical fiber amplifying means for receiving the output signal of the optical attenuating means and for amplifying the output signal according to a second amplifying control signal from the controlling means.

3. The automatic gain-controlled optical fiber amplifier as recited in claim 2, wherein the optical attenuating means attenuates the amplifying signal inputted from the first optical fiber amplifying means to the signal having a power suitable to the input of the second optical fiber amplifying means and is possible to change the scope of the power.

4. The automatic gain-controlled optical fiber amplifier as recited in claim 2, wherein the controlling means includes:

a first pumping laser control means for controlling the signal amplifying degree of the first optical fiber amplifying means according to a measurement result of the signal processing means;

an optical attenuating controlling means for controlling the variable optical attenuator according to the measurement result of the signal processing means; and a second pumping laser controlling means for controlling the signal amplifying degree of the second optical fiber amplifying means according to the measurement result of the signal processing means.

* * * * *